(12) United States Patent
Iwanaga et al.

(10) Patent No.: US 10,691,947 B2
(45) Date of Patent: Jun. 23, 2020

(54) MONITORING DEVICE (71) Applicant: HITACHI KOKUSAI ELECTRIC INC., Tokyo (JP)

(72) Inventors: Kazunari Iwanaga, Tokyo (JP); Wataru Ito, Tokyo (JP)

(73) Assignee: HITACHI KOKUSAI ELECTRIC INC., Tokyo (JP)

(*) Notice: Subject to any disclaimer, the term of this patent is extended or adjusted under 35 U.S.C. 154(b) by 0 days.

(21) Appl. No.: 16/328,176

(22) PCT Filed: Sep. 21, 2017

(86) PCT No.: PCT/JP2017/034087
§ 371 (c)(1),
(2) Date: Feb. 25, 2019

(87) PCT Pub. No.: WO2018/056355
PCT Pub. Date: Mar. 29, 2018

(65) Prior Publication Data
US 2019/0197313 A1 Jun. 27, 2019

(30) Foreign Application Priority Data

Sep. 23, 2016 (JP) .................... 2016-185489

(51) Int. Cl.
*G06K 9/00* (2006.01)
*G06T 7/194* (2017.01)
(Continued)

(52) U.S. Cl.
CPC ..... *G06K 9/00671* (2013.01); *G06K 9/00342* (2013.01); *G06K 9/00624* (2013.01);
(Continued)

(58) Field of Classification Search
CPC . G06T 7/194; G06T 7/11; G06T 7/248; G06T 7/20; G06K 9/00624; G06K 9/6202
See application file for complete search history.

(56) References Cited

U.S. PATENT DOCUMENTS

2008/0158361 A1* 7/2008 Itoh .................. G08B 13/19602
348/155
2010/0322475 A1* 12/2010 Ikeda ...................... G06T 7/254
382/103

(Continued)

FOREIGN PATENT DOCUMENTS

JP H05205175 A 8/1993
JP H10285586 A 10/1998
(Continued)

OTHER PUBLICATIONS

International Search Report issued in International Application No. PCT/JP2017/034087, dated Dec. 19, 2017.

*Primary Examiner* — Grace Q Li
(74) *Attorney, Agent, or Firm* — McDermott Will & Emery LLP (57) ABSTRACT

An image monitoring system includes: a reference image generation unit generating a reference image serving as a reference image, based on an input image; a foreground extraction unit detecting, from the input image, a foreground region different from the reference image; a stationary region extraction unit extracting a stationary region from the foreground region; a feature quantity extraction unit extracting a feature quantity of the stationary region; a feature quantity recording unit recording feature quantities as a function of time; a stationary object detection unit clustering pixels, recorded feature quantities of which meet predetermined criteria, and detecting a stationary object; a left object determination unit determining whether the stationary object is a left object, based on a feature quantity of the stationary (Continued)

object and evaluation of the surrounding environment; and a left object management unit managing attributes of left objects, and issuing a report when a certain condition is met.

11 Claims, 9 Drawing Sheets

(51) Int. Cl.

| | |
|---|---|
| *G06T 7/11* | (2017.01) |
| *G06T 7/246* | (2017.01) |
| *G08B 21/24* | (2006.01) |
| *G06T 7/20* | (2017.01) |
| *G06K 9/62* | (2006.01) |
| *H04N 7/18* | (2006.01) |
| *G08B 13/196* | (2006.01) |
| *G06T 7/00* | (2017.01) |

(52) U.S. Cl.
CPC .............. *G06K 9/6202* (2013.01); *G06T 7/00* (2013.01); *G06T 7/11* (2017.01); *G06T 7/194* (2017.01); *G06T 7/20* (2013.01); *G06T 7/248* (2017.01); *G08B 13/19617* (2013.01); *G08B 21/24* (2013.01); *H04N 7/18* (2013.01); *H04N 7/183* (2013.01); *G06K 2009/00738* (2013.01); *G06T 2207/10016* (2013.01); *G06T 2207/30196* (2013.01)

(56) References Cited

U.S. PATENT DOCUMENTS

| | | | |
|---|---|---|---|
| 2011/0019003 | A1 | 1/2011 | Asa et al. |
| 2014/0211988 | A1* | 7/2014 | Fan ................ G06K 9/3241 |
| | | | 382/103 |

FOREIGN PATENT DOCUMENTS

| | | |
|---|---|---|
| JP | 2008-104130 A | 5/2008 |
| JP | 2009-152748 A | 7/2009 |
| JP | 2011-029737 A | 2/2011 |
| WO | 2016135777 A1 | 9/2016 |

\* cited by examiner

FEATURE AMOUNT ACCUMULATED IMAGE

ACCUMULATED AMOUNT LOW  ACCUMULATED AMOUNT HIGH
(BLUE) (RED)

MONITORING DEVICE

CROSS REFERENCE

This application is a U.S. National Phase under 35 U.S.C. § 371 of International Application No. PCT/JP2017/034087, filed on Sep. 21, 2017 which claims the benefit of Japanese Application No. 2016-185489, filed on Sep. 23, 2016, the entire contents of both are hereby incorporated by reference.

TECHNICAL FIELD

The present invention relates to a monitoring device, for example, a monitoring device that has the function of acquiring video images from an imaging device such as a camera and detecting an abnormality or the like in a monitored area by image recognition.

BACKGROUND ART

Conventionally, imaging devices such as monitoring cameras have been used to monitor an object entering in a monitoring target region. In addition, there has been examined not a technique for manned monitoring by monitoring personnel but a technique for automatic monitoring by a video monitoring device or the like. A video monitoring device based on such a technique can implement the function of recording only video images in which a moving object appears by using the detection results, the function of displaying an alarm icon on a display device, and the function of sounding a beeper or the like to call attention of the monitoring personnel, which are useful in reducing the burden of monitoring operations in which constant checking has been conventionally required.

As an example of a technique for automatically detecting an object entering in a monitoring target region, there is widely known a monitoring technique using a background difference method (for example, refer to Patent Literature 1). According to an object detection method by using background difference, the difference in luminance (or pixel value) between an input image obtained from an imaging device or the like and a background image as a reference in which no object to be detected is seen is calculated. When there is any change region where the calculated detection value is larger than a predetermined threshold, it is determined that an object to be detected exists or possibly exists in the change region, and the change region is monitored.

In addition, for detecting a state in which a dangerous object or the like is left to stand, there is not only a method by merely detecting changes in the video image but also a method by detecting a motionless region in which no changes from the background image are constantly detected, as a left object.

CITATION LIST

Patent Literature

PATENT LITERATURE 1: JP-A-10-285586

SUMMARY OF INVENTION

Technical Problem

According to the left object detection method, moving body detection is performed by a difference method or the like, and when a moving object has been stationary for a certain time or more in a desired monitoring area, an alarm is activated. However, according to this method, less moving persons are detected as well as left objects. In addition, when there is a change in environments with the emergence of shades due to sunlight changes in the camera image, the environmental change may be wrongly recognized as the appearance of an object by the algorithm of the difference method, which leads to incorrect issue of an alarm.

When a person passes in front of a left object or a person exists around a left object, the left object and the person may be wrongly detected as one and the same object or the passing person may be mistaken for the left object so that the left object may not be regarded as non-moving object. As a means for identifying a left object separately from noise such as persons at a standstill and changes in sunlight, there is a method by which to identify a region where a stationary object is detected by histogram of oriented gradients (HoG)+ mechanical learning. However, the shape of a person greatly varies depending on the angle of view, and thus for the general-purpose use of this method, it is necessary to change learning data according to the angle of view, which is troublesome work. There is a means for learning data at all angles of view at the same time, but the use of this means lowers the detection accuracy at each angle of view. In addition, left objects and noise are predicted to have various shapes and thus prior learning is difficult. Even a learning method not requiring feature amount design such as Deep Learning needs a large amount of learning data. The foregoing method requires high-speed computing by a GPU and thus has a problem with process load.

In addition, as a means for taking measures for a case in which an object passes in front of a left object, there is a method by which, when a stationary object is detected, the detected region is registered as a template image, and after a predetermined time, the degree of similarity between the template image and an input image is calculated in the same coordinates by normalized cross-correlation or the like. There is also a method by which, when objects with a high degree of similarity are seen continuously, they are regarded as a left object. However, these methods have the problem that, when the template image is registered at a wrong timing when a person is standing still in front of a baggage or when there is a change in luminance due to sunlight change, a serious excessive alarm or wrong alarm may be issued.

The present invention is devised in light of these circumstances, and an object of the present invention is to solve the foregoing problems.

Solution to Problem

The present invention is a monitoring device that detects a change in an object in a monitoring region from an input image acquired by a video acquisition unit. The monitoring device includes: a reference image generation unit that generates a reference image as a reference for an image recognition process based on the input image; a foreground extraction unit that compares the input image with the reference image to detect a foreground region different from the reference image; a non-moving region extraction unit that compares the foreground region with the input image to extract a non-moving region from the foreground region; a feature amount extraction unit that extracts a feature amount of the non-moving region; a feature amount accumulation unit that accumulates the feature amount in a direction of time; a stationary object detection unit that performs clustering of pixels in which the feature amount accumulated by the feature amount accumulation unit satisfies a predetermined standard to detect a stationary object; a left object determination unit that determines whether the stationary object is a left object based on the feature amount of the stationary object and an evaluation of a surrounding environment; and a management unit that manages an attribute of the stationary object determined as the left object.

The monitoring device may include a display unit that superimposes at least one of a result of accumulation by the feature amount accumulation unit and a result of operation by the left object determination unit on the input image or the background image, and displays and outputs a standstill state of the left object in an identifiable manner.

When the attribute of the stationary portion satisfies an alarm issue condition, the management unit may issue an alarm.

Advantageous Effects of Invention

According to the present invention, it is possible to provide a technique with a detection unit that allows robust identification of a left object separately from persons at a standstill and noise and robust detection of a hidden left object by using an algorithm with light processing load.

DESCRIPTION OF EMBODIMENTS

Next, a mode for carrying out the present invention (hereinafter, simply called "embodiment") will be specifically described with reference to the drawings. An outline of a monitoring system (monitoring device) in the present embodiment will be as described below. Specifically, the monitoring system described below detects individual left objects out of objects in a monitored region under no influence of moving objects and others from video images input from a camera or recorded video images. According to the method for detection of a left object, it is possible to implement a monitoring technique for recording a left object and a person having left the object, issuing an alarm in the event of a left object, and calling attention of monitoring personnel by monitor display.

Figure 1:
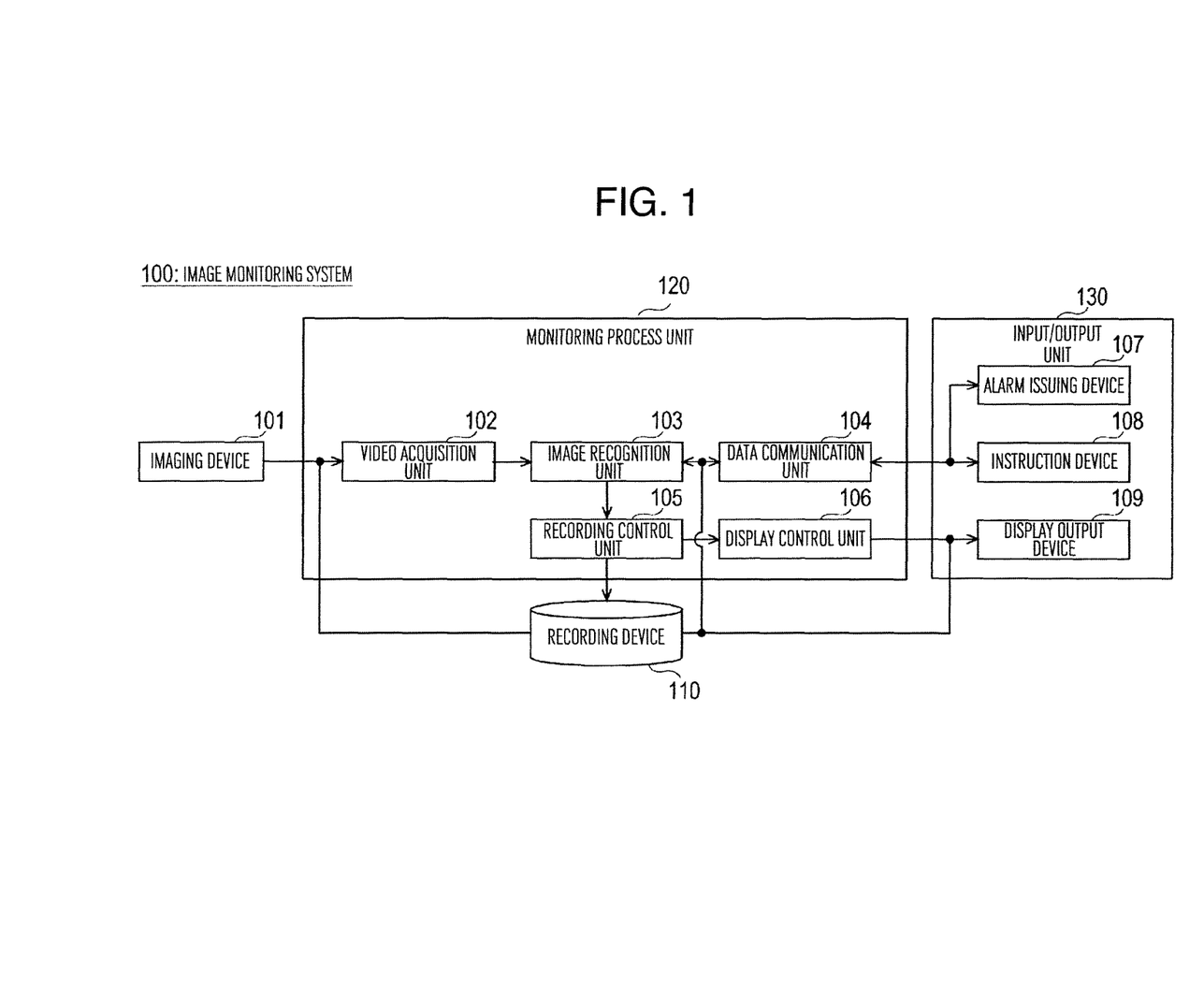
FIG. 1 is a block diagram of an image monitoring system according to an embodiment.

FIG. 1 is a block diagram illustrating a configuration of an image monitoring system 100 according to the present embodiment. The image monitoring system 100 is formed from an electronic computing system including a CPU as hardware to execute various functions. The hardware may be replaced with a structure other than an electronic computing system, such as DSP or FPGA.

The image monitoring system 100 includes an imaging device 101, a recording device 110, a monitoring process unit 120, and an input/output unit 130. The imaging device 101 is a television camera, for example, and one or more imaging devices 101 may be provided. The recording device 110 is a hard disk drive (HDD), for example, which records video images (monitoring results) shot by the imaging device 101 and outputs the same to the monitoring process unit 120 as necessary.

The monitoring process unit 120 acquires signals from the imaging device 101 or the recording device 110 as video images and performs a monitoring process based on video image processing. The monitoring results are output to the recording device 110 and the input/output unit 130.

Specifically, the monitoring process unit 120 includes a video acquisition unit 102, an image recognition unit 103, a data communication unit 104, a recording control unit 105, and a display control unit 106.

The video acquisition unit 102 acquires real-time image data from the camera (the imaging device 101) and image data in a one-dimensional array or two-dimensional array from video image signals input from the recording device 110 or the like where the image data is recorded.

The video acquisition unit 102 may perform pre-processing on the image data, such as application of a smoothing filter or contour enhancement filter and density conversion to reduce the influence of noise and flicker. The video acquisition unit 102 may select a data format such as RGB colors or monochrome according to the purpose of use, and further may perform a scale-down process on the image data to a predetermined size for reduction in processing costs.

The image recognition unit 103 recognizes a moving object and a left object by performing an image recognition process on the input image data from the video acquisition unit 102.

The data communication unit 104 is a communication interface for communication connection with the recording device 110 and the input/output unit 130 (in particular, an alarm issuing device 107 and an instruction device 108). Specifically, the data communication unit 104 transmits and receives the results of operation by the image recognition unit 103 and the information saved in the recording device 110 to and from other devices (the input/output unit 130 and others) located in local areas or a monitoring center (not illustrated) on a network.

The recording control unit 105 uses the results of calculation by the image recognition unit 103 to control the recording of video images, the compression ratio of the recorded video images, and recording intervals. The recording control unit 105 also records and holds the video images obtained from the video acquisition unit 102 in the recording device 110 or outputs the same to the display control unit 106.

The display control unit 106 controls the video images acquired by the video acquisition unit 102 and the results of operations by the image recognition unit 103, and controls the display of the information saved in the recording device 110.

The input/output unit 130 includes the alarm issuing device 107, the instruction device 108, and a display output device 109. The alarm issuing device 107 notifies the user of an abnormal state detected by the image recognition unit 103 by sound or light. The instruction device 108 acquires an instruction from the user to stop an alarm or the like, in response to a parameter used for the image recognition unit 103 and the contents of the alarm. The display output device 109 displays the information output from the display control unit 106.

Figure 2:
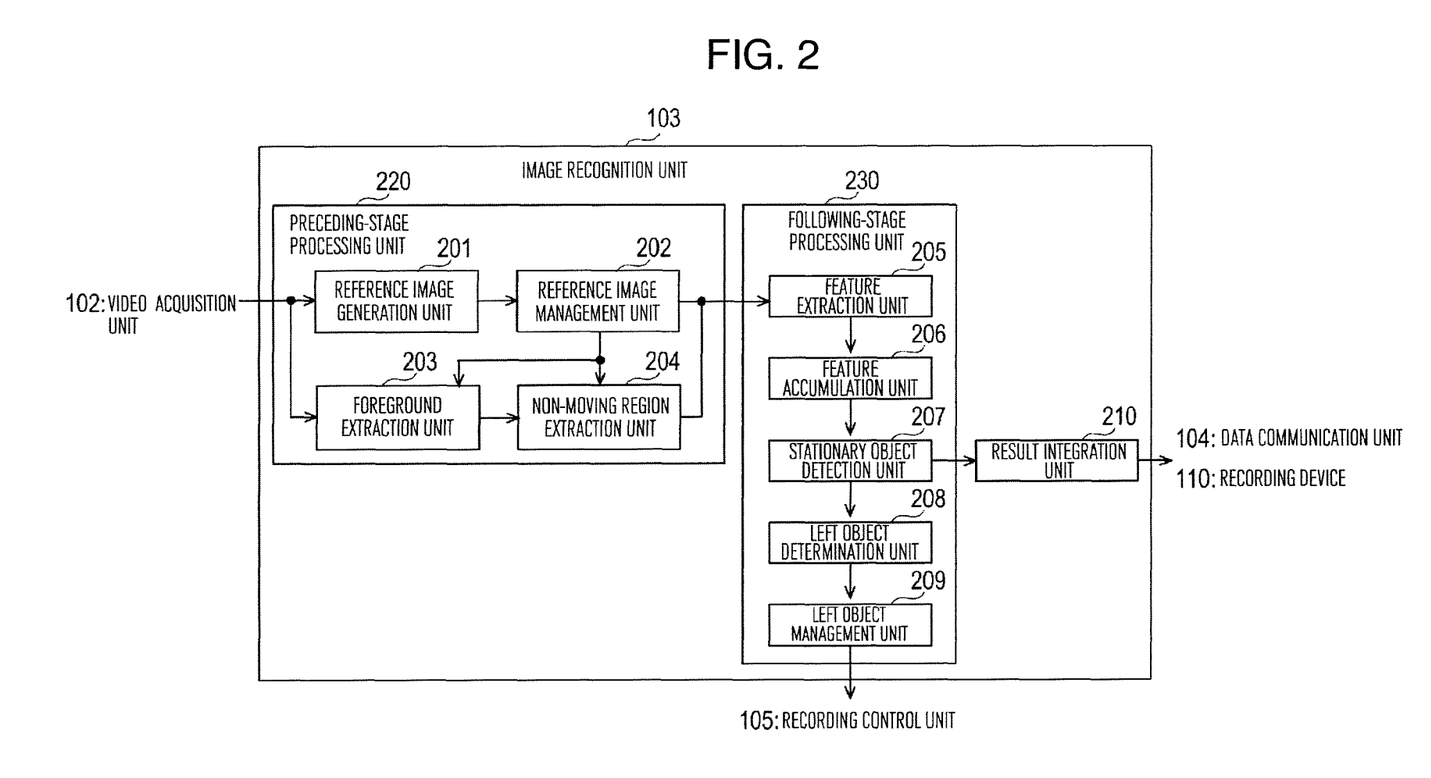
FIG. 2 is a block diagram of a monitoring process unit according to the embodiment.

FIG. 2 is a functional block diagram of the image recognition unit 103. The image recognition unit 103 includes a preceding-stage processing unit 220, a following-stage processing unit 230, and a result integration unit 210.

The preceding-stage processing unit 220 includes a reference image generation unit 201, a reference image management unit 202, a foreground extraction unit 203, and a non-moving region extraction unit 204.

The reference image generation unit 201 generates an image as a reference for an image recognition process from the input image acquired by the video acquisition unit 102, and outputs the same to the reference image management unit 202.

The reference image management unit 202 saves the image generated by the reference image generation unit 201. The foreground extraction unit 203 performs a comparison operation in a predetermined feature amount between the reference image saved in the reference image management unit 202 and the input image acquired by the video acquisition unit 102 to detect a foreground region different from a background in the video image. The non-moving region extraction unit 204 performs a comparison operation between temporal changes of the input image and the foreground region to extract a non-moving region from the foreground in the video image.

The following-stage processing unit 230 includes a feature extraction unit 205, a feature accumulation unit 206, a stationary object detection unit 207, a left object determination unit 208, and a left object management unit 209.

The feature extraction unit 205 extracts features such as edges of a non-moving region. The feature accumulation unit 206 accumulates the features extracted by the feature extraction unit 205 in the direction of time. The stationary object detection unit 207 performs a clustering process on the pixels of which the amount of features accumulated by the feature accumulation unit 206 (accumulated feature amount) satisfies a standard to detect a stationary object. The left object determination unit 208 observes the feature amount of a stationary object and the presence or absence of motion of the surroundings to determine whether the stationary object is a left object. The left object management unit 209 manages and saves information on the essence of a left object calculated by the number of left objects, the leaving time, the degree of similarity with the background, and others.

The result integration unit 210 integrates the results of detection of a left object by the stationary object detection unit 207 by superimposing the meta data on the coordinates and positions of the left object or the detected rectangle of the left object on the input image, and outputs the integrated result to the recording device 110 or the data communication unit 104 (the input/output unit 130).

The information saved in the reference image management unit 202 or the left object management unit 209 may be saved in the recording device 110 instead of the reference image management unit 202 or the left object management unit 209 or may be displayed on the display control unit 106 and the display output device 109.

The reference image generated by the reference image generation unit 201 is formed from at least two kinds of images, that is, the background image for detecting the foreground different from the background by a background difference method and the input image before a certain time for detecting instantaneous motion by an inter-frame difference method.

The background image for detecting the foreground different from the background is ideally an image that includes no moving object and is adapted to environmental changes such as momentary changes in weather and illumination. This is because, when a background image including a moving object and noise is compared to the input image, the moving object included in the background image may be detected as an environmental change, and without following the environmental changes, brightness changes due to illumination variation between the background image and the input image may be detected. Accordingly, in the present embodiment, the reference image generation unit 201 uses the results of operation by the foreground extraction unit 203 described later to perform a statistical process on images acquired for a certain period from which the influence of the moving object is removed, thereby to re-construct an image including no moving object.

Even when this method is used, it may be impossible to correspond to abrupt environmental changes in some cases. In those case, the left object determination unit 208 described later identifies those case so that no wrong alarm is issued. Besides, the background image may be registered by monitoring personnel. This makes it possible to generate the background image that includes no moving object and corresponds to environmental changes, which allows the accurate detection of the moving object.

The input image before a certain time for motion detection is an input image at a time t=t0−k with respect to the current time t=t0, for example. In this case, k represents an arbitrary constant. As a method for taking the inter-frame difference, the difference between two frames may be taken, or some algorithm may be used by which the difference among a plurality of frames such as three or more frames is taken to obtain the logical product with increased accuracy of detection of a moving object. In the case of using such a method, it is necessary to save a plurality of past input images.

The reference image management unit 202 saves the background image and the past input images generated by the reference image generation unit 201 at predetermined time intervals.

The foreground extraction unit 203 performs a comparison process between the background image and the past input images pre-calculated by the reference image generation unit 201 and saved by the reference image management unit 202 and the input image obtained by the video acquisition unit 102.

The information for use in the comparison process may be luminance values or RGB values calculated in each pixel in the input image, an arbitrary feature amount calculated by an operator such as edge strength or direction calculated by a differential filter, or a feature vector in which the foregoing values and amounts are integrated. The robustness and the detection accuracy to environmental changes vary depending on the feature amount, and thus it is necessary to determine the feature amount according to the situation. In the present embodiment, the most general information, luminance value, is selected as an example.

Conceivable methods for the comparison process are: (1) calculation by difference operation by pixel; (2) determination in local regions around the focused pixel; and (3) extension of a determination standard in a direction of time axis depending on the input image of several frames with respect to the reference image. In the present embodiment, a calculation method using difference operation by pixel is adopted as an example.

For the purpose of improvement in accuracy of the foreground extraction unit 203, pre-processing may be performed on the input image and the reference image by a smoothing process such as application of a Gaussian filter, or post-processing may be performed on the results of the comparison process by subjecting to an expansion or contraction process to shape the foreground region.

In the foreground extraction process described above, it is not possible to determine whether the region is a stationary region. The stationary object can be identified by determining the presence or absence of motion of the object through comparison between the past input reference images saved in the reference image management unit 202 and the current input image.

The non-moving region extraction unit 204 performs the foregoing determination. The outline of the determination will be described with reference to FIGS. 3 and 4.

Figure 3:
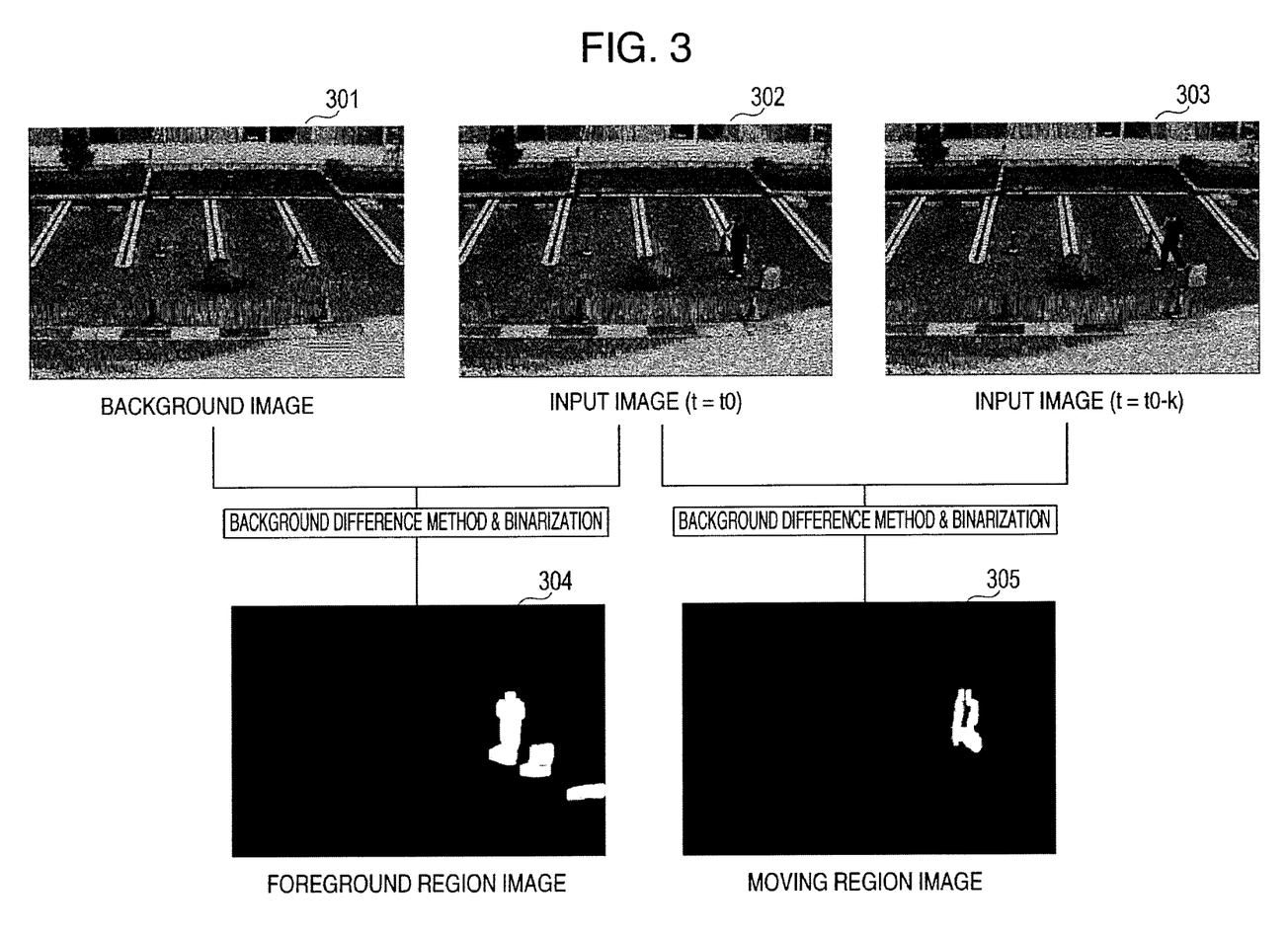
FIG. 3 is a diagram describing a process for generating a foreground region image and a moving region image according to the embodiment.

FIG. 3 is a diagram describing the process for generating a foreground region image 304 and a moving region image 305. The foreground region image 304 is generated by the foreground extraction unit 203 that compares a background image 301 with an input image (t=t0) 302 at a current time t=t0 and binarizes the comparison result by a certain threshold, and shapes the region by an expansion process.

The moving region image 305 is generated by the non-moving region extraction unit 204 that compares the input image (t=t0) 302 at the current time t=t0 with an input image (t=t0−k) 303 at a past time t0−k and binarizes the comparison result by a certain threshold, and shapes the region by an expansion process.

Figure 4:
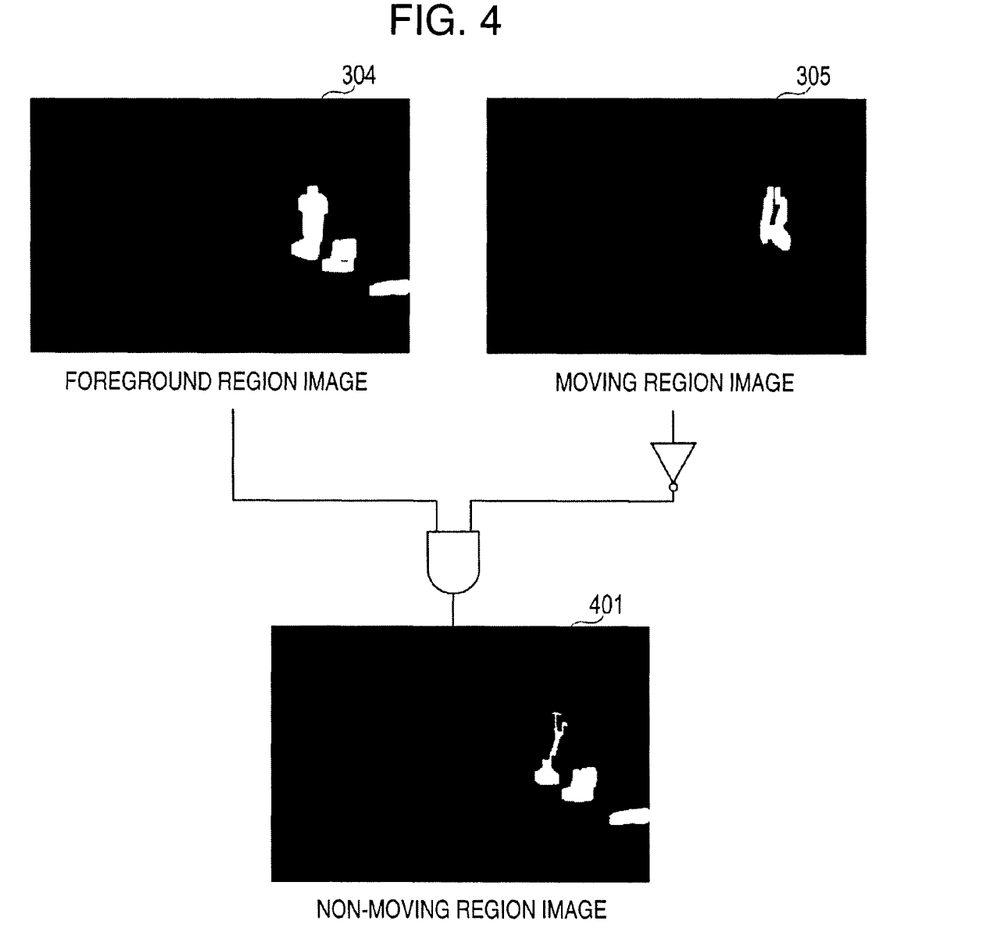
FIG. 4 is a diagram describing a process for generating a non-moving region image according to the embodiment.

FIG. 4 is a diagram describing a process for generating a non-moving region image 401. The non-moving region image 401 is an image obtained by taking the logical product of logical negation (NOT) of the moving region image 305 and the foreground region image 304. Accordingly, the non-moving region is extracted. However, in the foreground region image 304, if a person in clothes with a uniform pattern is seen with a minute amount of motion, for example, part of a region distant from the contour of the person may be wrongly determined as a non-moving region by some moving region detection algorithm. In the present embodiment, even in such a case, it is possible to find a target left object by following-stage processing while reducing the influence of the wrongly detected non-moving region.

Figure 5:
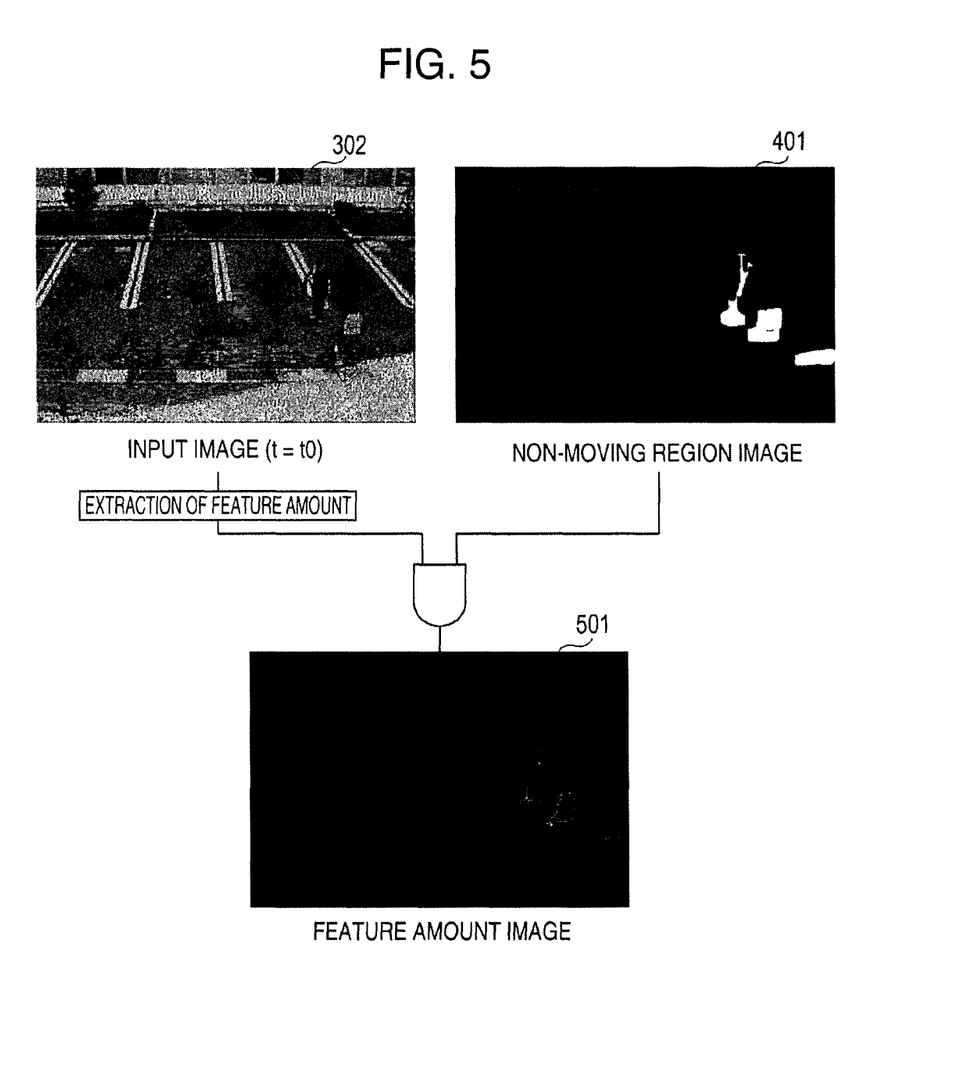
FIG. 5 is a diagram describing a process by a feature extraction unit according to the embodiment.

FIG. 5 is a diagram describing a process by the feature extraction unit 205. The feature extraction unit 205 extracts feature amounts relating to contours and textures in the input image (t=t0) 302 within a region determined as non-moving by the non-moving region extraction unit 204.

This is because contours and textures can be clearly distinguished from a truly non-moving region even if their motion is minute. In this case, as a feature amount, an edge feature based on Canny edge algorithm is used as an example.

The feature amount may be the amount of an edge feature based on Sobel filter or Laplacian filter or may be a texture feature in a matrix of the frequency of changes in luminance (gray level) between two pixels in an image such as gray level co-occurrence matrix (GLCM). The feature amount is differently seen depending on the position in the image, and thus the threshold or strength at the time of extraction of the feature amount may be corrected based on a camera parameter or the like at the front and back of the screen so that the feature amount can be normalized, for example. The feature amount is one-dimensional in the present embodiment, but may be multi-dimensional by combination of feature amounts.

A feature amount image 501 is obtained by extracting the feature amount from the input image (t=t0) 302 and taking the logical product of the input image (t=t0) 302 and the non-moving region image 401.

Next, a process by the feature accumulation unit 206 will be described. The feature accumulation unit 206 temporally accumulates the positions of features recorded in the feature amount image 501. As a means for accumulation, the feature amount images 501 in each frame can be averaged within a certain past range or residual errors can be averaged.

At this time, the feature amount may be accumulated such that the update rate of the feature amount is changed for each pixel using information on the feature amounts such as edges and textures originally included in the positions and background or information on the past occurrence frequencies of objects.

In the present embodiment, the feature amount accumulation rate of the pixels corresponding to the background region is increased with respect to the pixels corresponding to the foreground region of the foreground region image 304 so that the accumulated amount at the position where the object no longer exists is quickly decreased.

Figure 6:
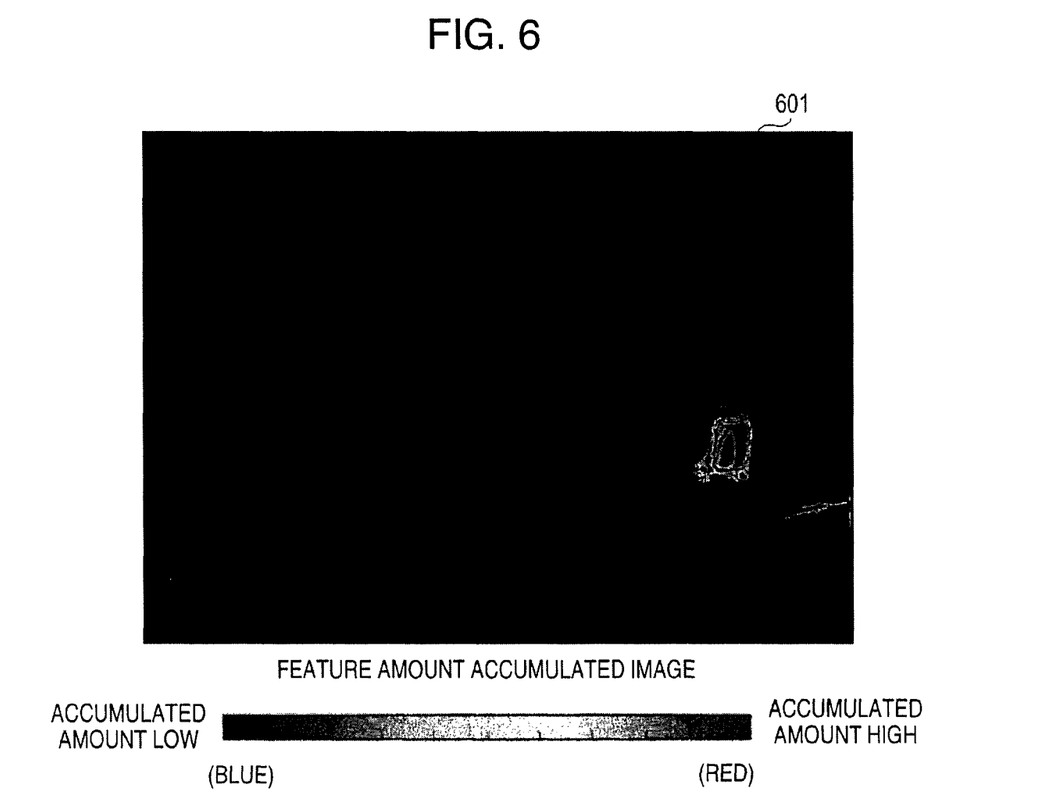
FIG. 6 is a diagram illustrating an example of feature amount accumulated image according to the embodiment.

FIG. 6 illustrates an example of a feature amount accumulated image 601. In the present embodiment, the accumulated feature amounts are expressed by a real number of 0 to 255, and the magnitudes of the accumulated amounts are associated with a given color table so that the accumulated amounts can be expressed in pseudo colors. The feature amount accumulated image 601 may be subjected to a spatial filter for expansion or contraction so that noise reduction or region shaping is performed.

Next, the stationary object detection unit 207 will be described. The stationary object detection unit 207 performs a threshold process on the accumulated feature amounts of the pixels in the feature amount accumulated image in the feature accumulation unit 206 to implement spatial clustering of the pixels exceeding a certain threshold. As a means for clustering, the stationary object detection unit 207 adopts a labeling method using raster scan and a lookup table.

Figure 7:
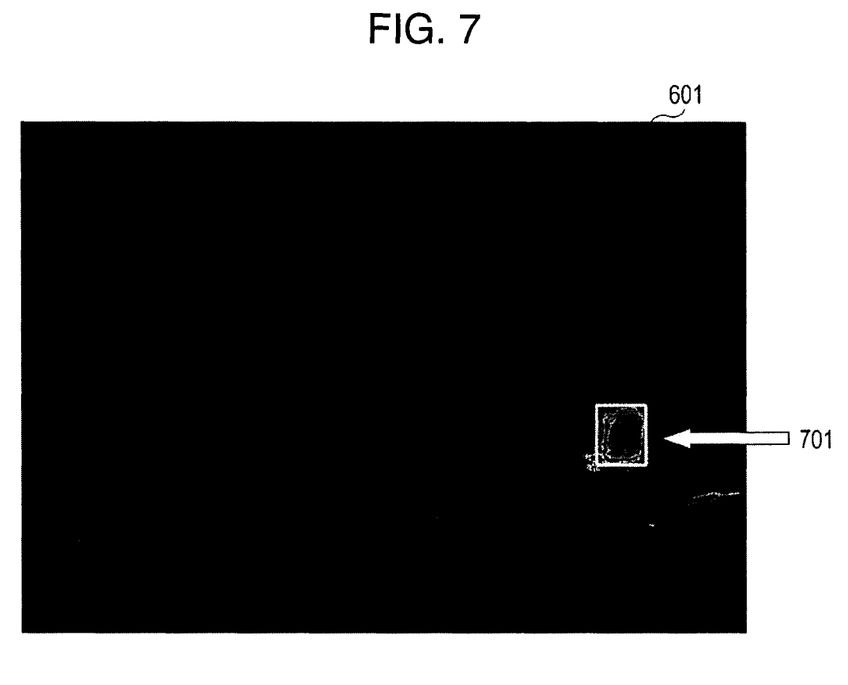
FIG. 7 is a diagram illustrating an example of a stationary candidate region according to the embodiment.

At the time of labeling, the stationary object detection unit 207 may observe temporal distances such as the magnitudes of accumulated feature amounts of the pixels as well as spatial distances and set the pixels within each of certain distances into groups. As the result of clustering, the stationary object detection unit 207 regards a region satisfying a specific condition such as a certain or larger size as stationary candidate region 701.

FIG. 7 illustrates an example of the stationary candidate region 701. The result of clustering of regions with accumulated feature amounts of 50% or more in the feature amount accumulated image 601 is the stationary candidate region 701.

Next, the left object determination unit 208 will be described. The left object determination unit 208 makes a determination on a left object by evaluating the surrounding environments of the stationary candidate region 701, specifically, evaluating changes in the surroundings. For example, the left object determination unit 208 detects in the stationary candidate region 701 a non-left object in the vicinity of an owner such as a baggage placed at the feet of the owner, a background texture region resulting from changes in background based on changes in sunlight or turning on/off of illumination, or part or entirety of a person at a standstill for a long time, and determines whether there is any left object to be determined as abnormal.

To discriminate between a background change and a left object, there is a method by which the similarities between the input image (t=t0) 302 and the background image 301 in the same coordinates as those of the stationary candidate region 701 are compared. The similarity can be calculated by determining the distance of luminance value at the position by a template matching method such as normalized cross-correlation or sum of absolute difference (SAD) to calculate the degree of similarity.

Figure 8:
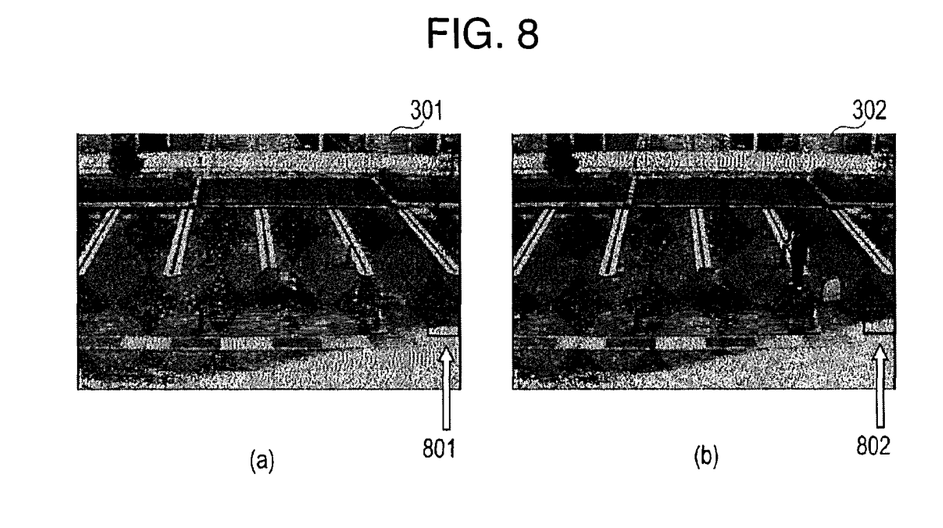
FIG. 8 is a diagram describing an example of a template matching method according to the embodiment.

FIG. 8 is a diagram describing an example of a template matching method. The degree of similarity between a stationary object candidate region image 801 in the background image 301 illustrated in FIG. 8(a) and a stationary object candidate region image 802 in the input image (t=t0) 302 illustrated in FIG. 8(b) is calculated by the foregoing method.

In this example, the degree of similarity between the stationary object candidate region image 801 and the stationary object candidate region image 802 is very high, that is, the stationary candidate region 701 illustrated in FIG. 7 can be regarded as being highly possibly a background texture region that is wrongly detected.

However, even when the degree of similarity becomes low by the passage of a person in front of the stationary object candidate region, the possibility of the candidate region being a background cannot be denied. Therefore, the degree of similarity in the direction of time may be observed such that only the region where the degree of similarity does not become high for a certain time is set as a candidate for a left object.

Figure 9:
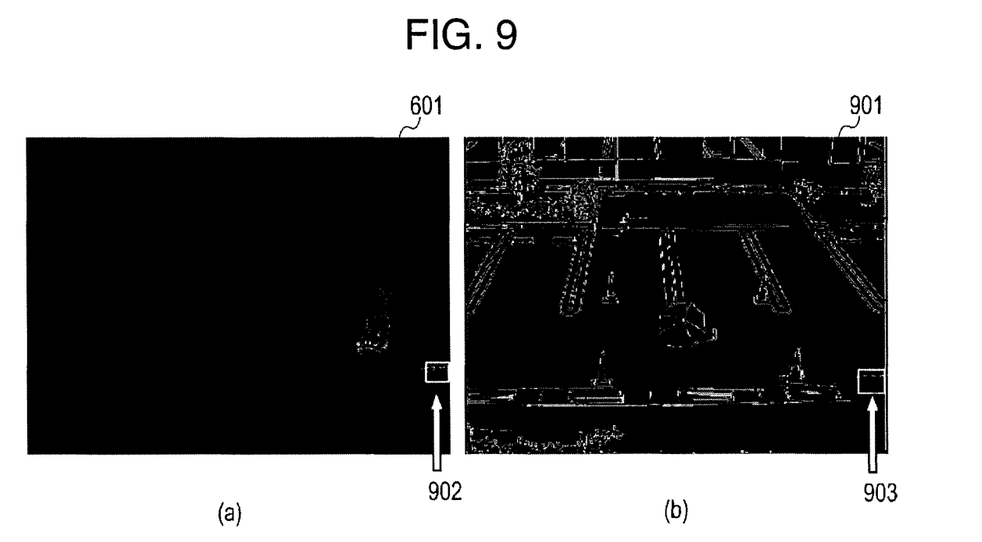
FIG. 9 is a diagram describing an example of a method for specifying a background using a method other than a similarity method according to the embodiment.

Besides the degree of similarity, there is a method by which the feature amount included in the background image 301 and the feature amount in the stationary object candidate region in the feature amount accumulated image 601 are compared to specify the background. FIG. 9 is a diagram describing an example of such a method. According to this method, the number of pixels in a stationary object candidate region rectangle 902 in the feature amount accumulated image 601 illustrated in FIG. 9(a) where the feature amount is a certain amount or more is compared to the number of pixels in a stationary object candidate region rectangle 903 in an image (a feature amount extracted image 901) obtained by performing feature amount extraction on the background image 301 illustrated in FIG. 9(b) where the feature amount is other than 0. When the difference in the number of pixels is a certain number or more, the candidate region in the feature amount accumulated image 601 is determined as background. This method allows more robust determination because the evaluation value does not become lower even if an object such as a person passes in front of a left object to block the view.

As a method for discriminating a left object from a non-left object in the vicinity of an owner such as a baggage placed at the feet of the owner or part or entirety of a person at a standstill for a long time, there is a technique for observing the amount of a moving region around the left object candidate region.

Figure 10:
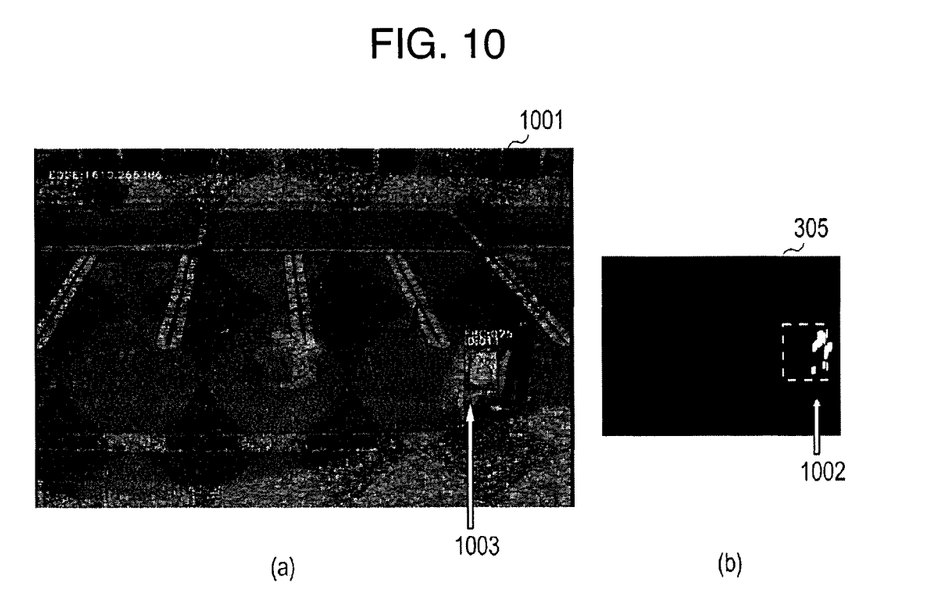
FIG. 10 is a diagram illustrating an example of a method for discriminating a left object according to the embodiment.

FIG. 10 is a diagram illustrating an example of a method for discriminating a left object. Around a stationary object candidate region 1003 of an image 1001 illustrated in FIG. 10(a), for example, within a range of a certain distance from the stationary object candidate region 1003, a moving region image 305 (illustrated in FIG. 10(b)) calculated and indicated by the non-moving region extraction unit 204 is referred to. When there exists a certain or more number of pixels (a region 1002) that is considered to be equivalent to a person, it is regarded that there is a high possibility that a moving object exists in the vicinity or the stationary object candidate region 1003 is a portion of a moving object. For a certain time after the detection of this event, the issue of an alarm about the left object is put on hold.

Next, the left object management unit 209 will be described. The left object management unit 209 records all the stationary object candidate regions acquired by the stationary object detection unit 207 and the attributes of the essence of a left object involved in those regions and calculated by the left object determination unit 208, for example, the degrees of similarity between the candidate regions and the background, the amounts of differences in feature amounts, the presence or absence of a surrounding moving region, the sizes of the candidate regions, and the durations of time that the candidate regions are continuously detected.

The user and the system administrator uses the instruction device 108 in advance to set the conditions for issuing an alarm (the size of an object, the duration of time that an object is left, and others) to the left object management unit 209. When information on a left object satisfying any of the alarm issuing conditions is stored, the left object management unit 209 develops the information to the alarm issuing device 107 and the recording device 110 through the data communication unit 104 or outputs the information to the display output device 109.

The result integration unit 210 integrates the detected results such that, out of the information on the left object candidates stored in the left object management unit 209, the position and attributes of a left object to be notified to the user and the system administrator can be output in the form of meta data or in the form of superimposition on the input image (t=t0) 302 or the background image 301, in general, in the form of an overlaid image.

Figure 11:
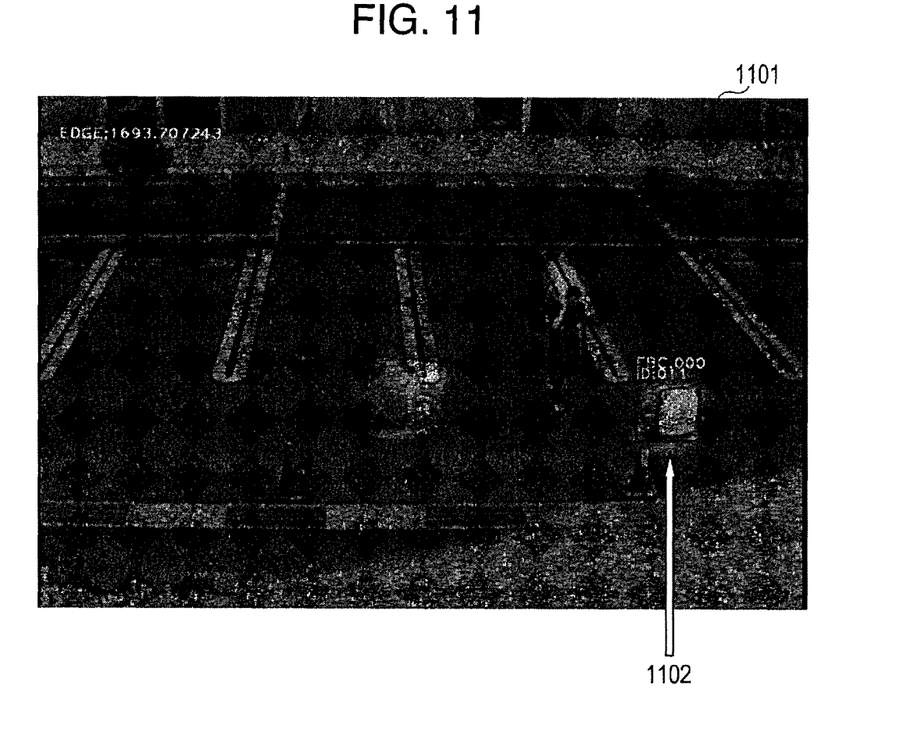
FIG. 11 is a diagram illustrating an example of an image in which detected left object information is superimposed on an input image (t=t0) according to the embodiment.

FIG. 11 illustrates an image 1101 as an example in which information on a detected left object (detected left object information 1102) is superimposed on the input image (t=t0) 302.

Figure 12:
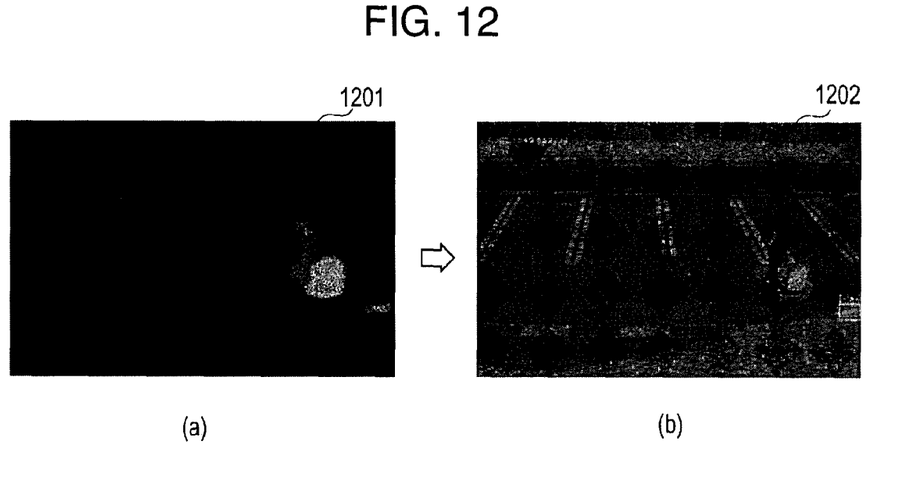
FIG. 12 is a diagram illustrating an overlay image in which a standstill degree heat map image is overlaid on the input image (t=t0) according to the embodiment.

As a means for not only indicating the position of a left object but also indicating the tendencies of standstill, congestion, and clogging of persons, for example, the accumulated feature amounts in the feature amount accumulated image calculated by the feature accumulation unit 206 are converted by an index of standstill degree, and the standstill degrees are imaged and overlaid on the input image. This makes it possible to visualize the tendencies of standstill in a manner easy-to-understand for the user.

As an example, FIG. 12 illustrates an image (overlay image 1202 (FIG. 12(b)) in which a standstill degree heat map image 1201 (FIG. 12(a)) acquired by performing spatial processing with a Gaussian filter on a feature amount accumulated image expressed in pseudo colors is overlaid on the input image (t=t0) 302 by a blending. Accordingly, using the technique of the present embodiment implements a means for visualizing standstill and congestion status as well as a means for detecting a left object.

In addition, when the position, height, angle of depression, and focal distance of the shooting camera are known, the position of a left object may be converted into a world coordinate system using camera parameters and mapped on a map. This is also applicable to the standstill degree heat map image 1201. Overlaying the heat map image converted into a world coordinate system on a map makes it possible to visualize the positions and degrees of congestion and standstill.

The image recognition unit 103 records the image of a stationary object candidate region found for the first time so that, when a left object is detected by the left object determination unit 208, the input image of the stationary object candidate region found for the first time in the recording device 110 can be referred to find a person having left the left object.

Combining the image monitoring system 100 of the present embodiment with a face search system or a clothes search system makes it possible to search for a person having left the left object from the recording device 110 so that police investigations can be supported or a person having forgot to bring something can be found in a more efficient manner, for example.

According to the image monitoring system 100 of the present embodiment, it is possible to implement a technique for robust identification of a left object separately from persons at a standstill and noise and robust detection of a hidden left object by using light algorithm not requiring a GPU, that is, an algorithm with light processing load.

The present invention has been described so far based on the embodiment. This embodiment is a mere example and it is to be understood by persons skilled in the art that combinations of components of the embodiment can be modified in various manners and those modifications fall within the scope of the present invention.

REFERENCE SIGNS LIST

100 Image monitoring system
101 Imaging device
102 Video acquisition unit
103 Image recognition unit
104 Data communication unit
105 Recording control unit
106 Display control unit
107 Alarm issuing device
108 Instruction device
109 Display output device
110 Recording device
120 Monitoring process unit
130 Input/output unit
201 Reference image generation unit
202 Reference image management unit
203 Foreground extraction unit
204 Non-moving region extraction unit
205 Feature extraction unit
206 Feature accumulation unit
207 Stationary object detection unit
208 Left object determination unit
209 Left object management unit
210 Result integration unit
220 Preceding-stage processing unit
230 Following-stage processing unit

The invention claimed is:

1. A monitoring device that detects a change in an object in a monitoring region from an input image acquired by a video acquisition unit, comprising:
a reference image generation unit that generates a reference image as a reference for an image recognition process based on the input image;
a foreground extraction unit that compares the input image with the reference image to detect a foreground region different from the reference image;
a non-moving region extraction unit that compares the foreground region with the input image to extract a non-moving region from the foreground region;
a feature amount extraction unit that extracts a feature amount of the non-moving region;
a feature amount accumulation unit that accumulates the feature amount in a direction of time;
a stationary object detection unit that performs clustering of pixels in which the feature amount accumulated by the feature amount accumulation unit satisfies a predetermined standard to detect a stationary object, wherein, at the time of labeling, the stationary object detection unit observes temporal distances such as the magnitudes of accumulated feature amounts of the pixels as well as spatial distances, and sets the pixels within each of certain distances into groups;
a left object determination unit that determines whether the stationary object is a left object based on the feature amount of the stationary object and an evaluation of a surrounding environment; and
a management unit that manages an attribute of the stationary object determined as the left object.

2. The monitoring device according to claim 1, comprising a display unit that superimposes at least one of a result of accumulation by the feature amount accumulation unit and a result of operation by the left object determination unit on the input image or the background image and displays and outputs a standstill state of the left object in an identifiable manner.

3. The monitoring device according to claim 1, wherein the management unit issues an alarm when the attribute of the stationary portion satisfies an alarm issuing condition.

4. The monitoring device according to claim 2, wherein the management unit issues an alarm when the attribute of the stationary portion satisfies an alarm issuing condition.

5. The monitoring device according to claim 1, wherein the feature amount accumulation unit averages feature amount accumulated images in every frame within a certain past range or averages residual errors.

6. The monitoring device according to claim 1, wherein, to compare similarities between the input image and the background image in the same coordinates as those of the stationary candidate region, a degree of similarity is calculated by determining a distance of luminance value at a position of the stationary object by a template matching method such as normalized cross-correlation or sum of absolute difference (SAD) to discriminate between a background change and a left object.

7. The monitoring device according to claim 1, wherein, as a means for indicating tendencies of standstill, congestion, and clogging of persons, for example, the feature amount accumulated image calculated by the feature accumulation unit is converted by an index of standstill degree, and the standstill degree is imaged and overlaid on the input image to visualize the tendencies of standstill.

8. The monitoring device according to claim 1, wherein an image in which a standstill degree heat map image acquired by performing spatial processing with a Gaussian filter on a feature amount accumulated image expressed in pseudo colors is overlaid on the input image by a blending is displayed.

9. The monitoring device according to claim 1, wherein, for a position of the left object, when a position, height, angle of depression, and focal distance of a shooting camera are known, the standstill degree heat map image is converted into a world coordinate system using camera parameters and the converted heat map image is mapped on a map to visualize positions and degrees of congestion and standstill.

10. The monitoring device according to claim 1, wherein an image of a candidate region of the stationary object found for the first time is recorded in a recording device so that, when a left object is detected by the left object determination unit, the input image of the stationary object candidate region found for the first time in the recording device is referred to with respect to a person having left the left object.

11. The monitoring device according to claim 10 wherein a face search system or a clothes search system is combined so that the recording device is searched for a person having left the left object.

* * * * *